United States Patent [19]
Morgan et al.

[11] Patent Number: 5,204,029
[45] Date of Patent: Apr. 20, 1993

[54] METHODS OF ENCAPSULATING LIQUIDS IN FATTY MATRICES, AND PRODUCTS THEREOF

[75] Inventors: Robert Morgan; Peter A. Blagdon, both of Paris, Ill.

[73] Assignee: Morgan Food Products, Inc., Paris, Ill.

[21] Appl. No.: 412,300

[22] Filed: Sep. 25, 1989

[51] Int. Cl.$^5$ .............................. B01J 13/02
[52] U.S. Cl. ........................ 264/4.4; 426/89; 426/96; 426/98; 426/99; 426/524; 426/609
[58] Field of Search .......... 426/89, 96, 98, 99, 426/524, 609; 264/4.4

[56] References Cited

U.S. PATENT DOCUMENTS

| | | | |
|---|---|---|---|
| 2,785,983 | 3/1957 | McMath | 99/140 |
| 2,857,281 | 10/1958 | Schultz et al. | 99/140 |
| 3,161,602 | 12/1964 | Herbig et al. | 252/316 |
| 3,423,489 | 1/1969 | Arens et al. | 264/4 |
| 3,436,355 | 4/1969 | Bakan | 252/316 |
| 3,764,346 | 10/1973 | Noznick et al. | 426/96 |
| 3,819,838 | 6/1974 | Smith et al. | 426/89 |
| 3,856,699 | 12/1974 | Miyano et al. | 252/316 |
| 3,977,992 | 8/1976 | Hofacker | 252/316 |
| 4,173,492 | 11/1979 | Pollard | 106/308 |
| 4,675,236 | 6/1987 | Ohkawara et al. | 428/402.24 |
| 4,753,807 | 6/1988 | Fuseya et al. | 426/99 |

FOREIGN PATENT DOCUMENTS

62-201635  9/1987  Japan.

OTHER PUBLICATIONS

Kirk-Othmer Encyclopedia of Chemical Technology 3rd ed. vol. 15, John Wiley and Sons p. 476.
Kirk-Othmer *Encyclopedia of Chemical Technology*, 3rd ed., vol. 15, John Wiley & Sons pp. 473-474.

*Primary Examiner*—Joseph Golian
*Assistant Examiner*—Evan Federman
*Attorney, Agent, or Firm*—Roper & Quigg

[57] ABSTRACT

Microcapsules having a solid, fusible shell and a multiplicity of liquid cores. The microcapsules can be made by spray-cooling a water-in-oil type emulsion. The microcapsules, in aggregate, are a dry, free-flowing powder, and can be heated or otherwise processed to release their contents. The microcapsules can be used in food and non-food applications. The core can be any liquid, preferably aqueous, which does not readily dissolve or disperse the shell.

5 Claims, 1 Drawing Sheet

METHODS OF ENCAPSULATING LIQUIDS IN FATTY MATRICES, AND PRODUCTS THEREOF The present invention relates to microcapsules, which are particles having diameters of one to one thousand microns, of the type having a fusible shell surrounding multiple liquid cores. The invention relates particularly to such microcapsules which have been manufactured by forming a molten water-in-oil emulsion of the materials of the core and shell and spray cooling the emulsion. One contemplated utility for the microcapsules is to contain and deliver food ingredients.

BACKGROUND ART

Microcapsules in which the core is a single liquid droplet and the shell is a fusible material are known. (See, for example, *Kirk-Othmer Encyclopedia of Chemical Technology*, 3d ed., Vol. 15, pages 473-474.) The microcapsules described there are produced by a process developed by the Southwest Research Institute, in which the core phase of material and the shell phase are separately liquefied and sprayed through concentric nozzles, forming molten droplets in which the shell phase encapsulates the core phase. The droplets are cooled, as with a countercurrent of air, to form solid particles.

Microcapsules made by the Southwest process have a solid shell and a single liquid core (like eggs), so they are very susceptible to rupturing. When many microcapsules are collected to form a bulk powder, the rupture of a small proportion of the microcapsules can reduce a free-flowing powder of the microcapsules to a sticky mass which no longer flows freely. Such a material thus cannot be handled in bulk with any facility. An additional disadvantage of the Southwest process is the need for very precise control of orifice sizes, pump pressures, and temperatures, so production costs are high and production rates are low.

Microcapsules in which the phases are reversed, the inner phase being an oily material and the outer phase being an aqueous suspension or solution which is dried by spray drying to form a solid coating, are also known. (See U.S. Pat. Nos. 3,819,838, issued to Smith, et al. on Jun. 25, 1974; 2,785,983, issued to McMath on Mar. 19, 1987; 2,857,281, issued to Schultz, et al. on Oct. 21, 1958; and 3,764,346, issued to Noznick, et al. on Oct. 9, 1973.)

Other prior art describes solid particles which are coated with a fusible material. (See, for example, U.S. Pat. Nos. 4,173,992, issued to Pollard on Nov. 6, 1979; 3,856,699, issued to Miyano, et al. on Dec. 24, 1974; 3,819,838 (cited before—shows overcoating a microparticle having a solid wall with a fusible material); and 4,675,236, issued to Ohkawara, et al. on Jun. 23, 1987). In most of the prior art, because the aqueous material is on the outside, and because water is readily removed from the aqueous material by spray drying or other means, a spray cooling process is not usually used to form the microparticles.

It is also well known that microcapsules can be made by preparing an emulsion and spraying the emulsion to divide it into particles. However, this process has conventionally been used with oil-in-water emulsions. Being the continuous phase, the water solution forms the outside of the capsule.

Finally, the Kirk-Othmer citation previously set forth, page 476, describes the emulsification of water into melted fat or wax, which emulsion is then subdivided into a discontinuous phase of a second emulsion, the continuous phase of which is cooled below the fusion temperature of the melted fat. Particles of the first emulsion are then separated from the water phase of the second emulsion. The result is a water phase encapsulated in congealed fat or wax. The reference does not state whether the water phase within each shell is subdivided into a multiplicity of cores.

OBJECTS OF THE INVENTION

One object of the present invention is a microcapsule having a fusible solid outer wall and a multiplicity of isolated liquid cores. A further object of the present invention is to produce such a particle from an emulsion by spraying the complete emulsion. Another object of the invention is to produce the desired microcapsules economically, with relatively simple apparatus and noncritical process conditions. A still further object of the invention is a process for making the desired microcapsules, in which the transport of the emulsion from the mixing apparatus to the spray cooling apparatus can be carried out without allowing the emulsion to separate into its component phases. Yet another object of the invention is a strong microcapsule which must be crushed or its shell melted to release its liquid core. Other objects of the invention will become apparent from the present specification.

SUMMARY OF THE INVENTION

A first aspect of the invention is a microcapsule which has a solid, fusible shell and a multiplicity of normally liquid cores. The materials of the core and shell are immiscible to maintain the integrity of the shell before the material of the core is intended to be released.

A second aspect of the invention is a microcapsule as described above, made as follows (or by an equivalent process). First, the material of the fusible solid shell and the material of the core are provided. Next, the materials are emulsified under such conditions that the core is the discontinuous or inner phase and the material of the shell is the continuous phase. Either before or after the emulsion is formed, its components are heated sufficiently that the temperatures of both phases exceed the melting point of the shell material. Next, the emulsion is spray cooled to a final temperature lower than the melting point of the shell material. The particles formed during the spray cooling process are globules in which the continuous phase is a liquid shell or coating and the discontinuous phase remains liquid. During the cooling part of the spray cooling process, the outer shell is cooled sufficiently to become solid, thus entrapping the liquid cores and preventing the emulsion from breaking. If desirable or necessary, the shell can be further cooled by immersing the microcapsules in a cooling liquid or gas.

A second aspect of the invention is the previously stated process for forming microcapsules.

BRIEF DESCRIPTION OF DRAWINGS

The drawing figure is a schematic view of apparatus for forming and spray cooling emulsions according to the present invention.

DETAILED DESCRIPTION OF THE INVENTION

Figure 1:
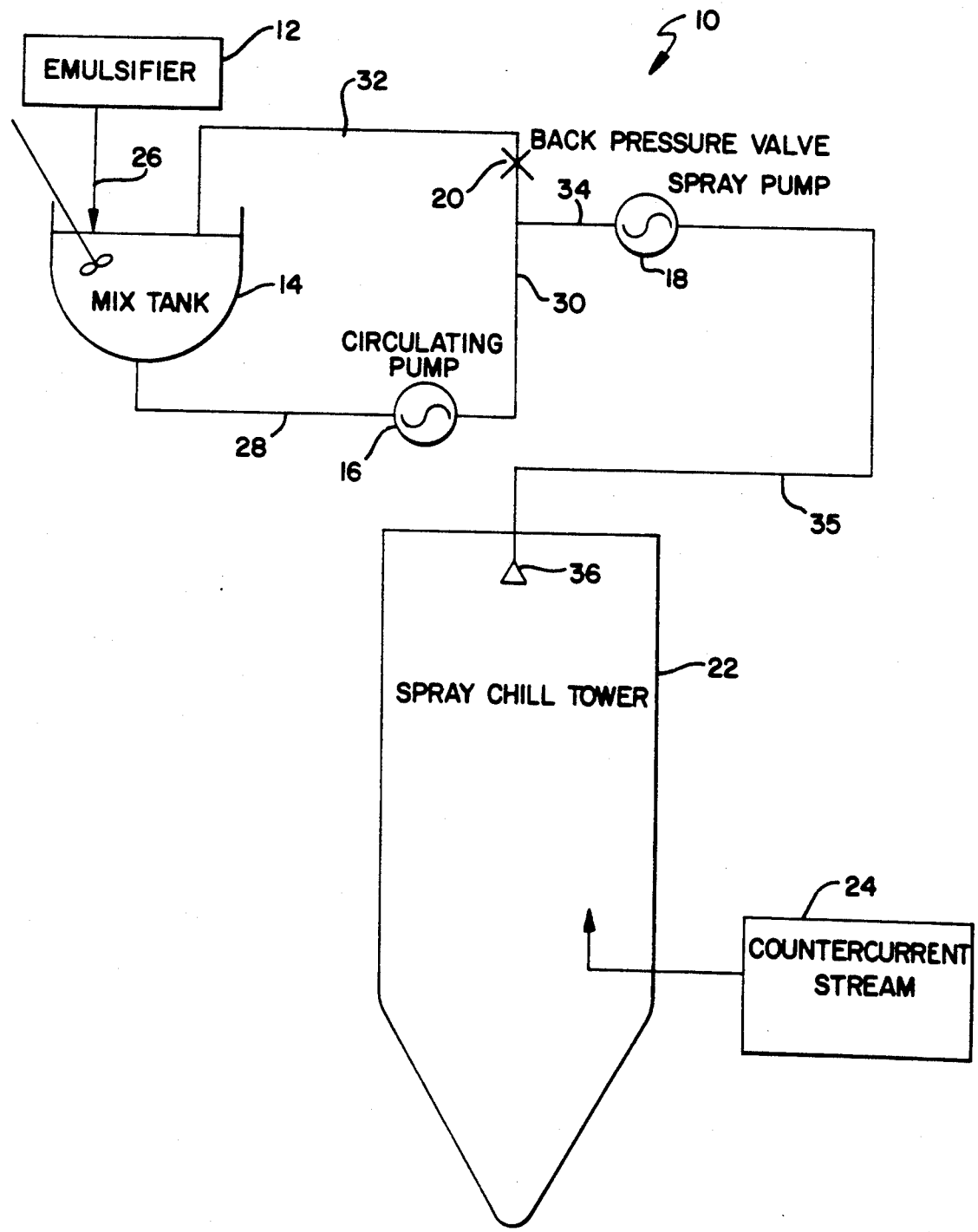

The microcapsules herein preferably have a diameter between about 180 microns and about 1,000 microns, most preferably greater than about 400 microns. The microcapsules according the present invention have a multiplicity of cores surrounded by a shell. (For purposes of the present invention, a "multiplicity" of cores is defined as three or more cores). The microcapsules are preferably supplied as a free flowing powder. The material which is to form the fusible solid shell can, broadly speaking, be any material which can be melted, emulsified, and then solidified.

A first category of fusible materials useful herein is that of normally solid fats, including fats which are already of suitable hardness and animal or vegetable fats and oils which are hydrogenated until their melting points are sufficiently high to serve the purposes of the present invention. Depending on the desired process and storage temperatures and the specific material selected, a particular fat can be either normally solid or normally liquid material. The terms "normally solid" or "normally liquid" as used herein refer to the state of a material at desired temperatures for storing the resulting microcapsules. Since fats and hydrogenated oils do not, strictly speaking, have melting points, the term "melting point" is used herein to describe the minimum temperature at which the fusible material becomes sufficiently softened or liquid to be successfully emulsified and spray cooled, thus roughly corresponding to the maximum temperature at which the shell material has sufficient integrity to prevent release of the inner core. "Melting point" is similarly defined herein for other materials which do not have a sharp melting point.

Specific examples of fats and oils useful herein (some of which require hardening) are as follows:
animal oils and fats, such as:
  beef tallow;
  mutton tallow;
  lamb tallow;
  lard or pork fat;
  fish oil; and
  sperm oil;
vegetable oils, such as:
  canola oil;
  cottonseed oil;
  peanut oil;
  corn oil;
  olive oil;
  soybean oil;
  sunflower oil;
  safflower oil;
  coconut oil;
  palm oil;
  linseed oil;
  tung oil; and
  castor oil;
fatty acid monoglycerides and diglycerides;
free fatty acids, such as
  stearic acid;
  palmitic acid; and
  oleic acid;
and mixtures thereof.

The above list of oils and fats is not meant to be exhaustive, but only exemplary.

Another category of fusible materials useful as shell materials herein is that of waxes. Representative waxes contemplated for use herein are as follows:
animal waxes such as:
  beeswax;
  lanolin;
  shell wax; or
  Chinese insect wax;
vegetable waxes, such as:
  carnauba;
  candelilla;
  bayberry; or
  sugar cane;
mineral waxes, such as:
  paraffin
  microcrystalline petroleum;
  ozocerite;
  ceresin; or
  montan
synthetic waxes such as;
  low molecular weight polyolefin (e.g. CARBOWAX);
  polyol ether-esters (e.g. sorbitol);
  Fischer-Tropsch process synthetic waxes;
and mixtures thereof.

Water-soluble waxes, such as CARBOWAX and sorbitol, are not contemplated herein if the core is aqueous.

Still other fusible compounds useful herein are fusible natural resins such as:
  rosin;
  balsam;
  shellac;
and mixtures thereof.

Mixtures of different types of the above materials, or materials not specifically recited above but having the desired properties, are also contemplated herein.

One category of fusible materials specifically contemplated herein is materials which are edible and can be used to produce microencapsulated foodstuffs. The preferred edible oils are those which are relatively stable and resistant to oxidation.

Various adjunct materials are contemplated for incorporation in fusible materials according to the present invention. For example, antioxidants, light stabilizers, dyes, flavors, essential oils, and the like can be incorporated in the fusible material in amounts which do not diminish its utility for the present invention.

The core material contemplated herein constitutes from about 1% to about 35% by weight of the microcapsules, preferably no more than about 25% by weight of the microcapsules, with a preferred minimum being about 0.5% by weight of the microcapsules. The core material is a liquid at the contemplated storage temperature of the microcapsules, and preferably has a boiling point which is greater than the processing temperature, thus eliminating the necessity to operate the process under sufficient pressure to elevate the boiling point of the core material. However, it will be understood that materials having a lower nominal boiling point than the process temperature can be used at an elevated pressure. Since in one embodiment of the invention the shell material has a melting point between 110° F. and 195° F., the preferred core materials will have boiling points exceeding 110° F. (43° C.), preferably exceeding 210° F. (99° C.), and exceeding the melting point of the particular contemplated shell material.

In one preferred embodiment of the invention, the core is aqueous, and if aqueous it is highly desirable that the core be a true solution of a solute in a solvent consisting essentially of water. In such core materials, the solute may be a material suitable for addition to food products. For example, the solute of the core material may be any of the following:

edible sugars, such as:
  sucrose;
  glucose;
  maltose;
  fructose;
  lactose;
  cellobiose;
and mixtures thereof;
artificial sweeteners, such as:
  aspartame;
  saccharin
  cyclamate salts;
and mixtures thereof;
edible acids, such as:
  acetic acid (vinegar);
  citric acid;
  ascorbic acid (Vitamin C);
  tartaric acid;
and mixtures thereof;
edible starches, such as
  corn starch;
hydrolyzed vegetable protein;
water-soluble vitamins, such as
  Vitamin C;
water-soluble medicaments;
water-soluble nutritional minerals, such as:
  ferrous sulfate;
flavors;
salt;
monosodium glutamate;
antimicrobial agents, such as sorbic acid;
antimycotic agents, such as:
  potassium sorbate;
  sorbic acid;
  sodium benzoate; and
  benzoic acid;
food grade pigments and dyes;
and mixtures thereof.

Other useful solutes will readily occur to one of ordinary skill in the art, and within the conditions described above most water-soluble materials should be useful herein.

Emulsifying agents are contemplated herein to assist in the formation of stable emulsions. Representative emulsifying agents useful herein are as follows:
glyceryl monostearate;
polysorbate esters;
ethoxylated mono- and diglycerides;
and mixtures thereof.

While much of the preceding disclosure is largely directed to edible materials, it will also be appreciated that inedible materials can be used herein.

One important feature of edible aqueous core materials is that they should have a pH of less than about 4 or a water activity, Aw, of about 0.7 or less (unless an antimicrobial compound is present). This low pH or water activity renders the microcapsules resistant to growth or reproduction of many types of microbes, thus retarding or preventing spoilage. However, mold or yeast growth can occur even if the water activity of the core is less than 0.7. Antimycotic agents are therefore contemplated for use herein even when the water activity of the core is less than 0.7.

For ease of processing, and particularly to enable the successful formation of a reasonably stable emulsion, the viscosities of the core material and the shell material should be similar at the temperature at which the emulsion is formed. Expressed more precisely, the ratio of the viscosity of the shell to the viscosity of the core, expressed in centipoise or comparable units, and both measured at the temperature of the emulsion, is from about 22:1 to about 1:1, desirably from about 8:1 to about 1:1, preferably from about 3:1 to about 1:1. A ratio of 1:1 would be ideal, but a range of ratios is useful.

Another requirement is that the core material and the shell material should be immiscible under the conditions at which the microcapsules are formed and intended to be stored.

A preferred process for preparing microcapsules according to the present invention will now be described. Referring to the figure, the apparatus generally indicated at 10 includes an emulsifier 12, a mix tank 14, pumps 16 and 18, a back pressure valve 20, a spray chill tower 22, a source 24 of a countercurrent stream of cooling gas, and conduits 26, 28, 30, 32, 34, and 35. Emulsifier 12 is a high shear mixer of the type commonly used to prepare emulsions.

The core material and shell material, each preferably in fluid form, are supplied to emulsifier 12, where they are emulsified to form a water-in-oil emulsion. The product of emulsifier 12 is supplied by a conduit or other means 26 to a mix tank 14 which is stirred to maintain the emulsion before it is spray cooled. Mix tank 14 may conveniently be supplied with a recycle loop constituting conduit 28, pump 16, back pressure valve 20 (which maintains a head of pressure in the recycle line), and conduit 32. Circulating pump 16 provides a sufficient flow rate to keep the material in the recycle loop in turbulent flow continuously, thereby maintaining the emulsion intact. Conduit 30 is tapped by conduit 34 to supply the emulsion to spray pump 18.

The effluent of pump 18 travels via conduit 35 to a nozzle 36, which can be a single or multiple nozzle. The emulsion is sprayed into chill tower 22. Immediately after leaving nozzle 36, the emulsion is subdivided into droplets in which the continuous layer, comprised of a fusible material, envelops droplets of the normally-liquid material. By regulating the proportions of ingredients and the size of the droplets sprayed from nozzle 36 versus the size of the discontinuous phase, multiple droplets of the normally-liquid core material can be enveloped in a single shell.

While in the chill tower, the originally liquid shell is cooled sufficiently to harden into a form-retaining condition. Ideally, the shell is hardened sufficiently by the countercurrent of air or other gas to form a free-flowing powder when collected with other microcapsules as a bulk powder.

The relative sizes of the cores and shell can be varied according to the process conditions. The size of each core is determined by the emulsification conditions, which determine the size of the discontinuous phase droplets. The size of each shell is determined by the spraying conditions chill tower 22 and the proportions of the oil phase and water phase. If the microcapsules are sticky, due to the fusible material being fairly soft or small amounts of discontinuous phase being deposited on the shell surfaces, a free flowing product can be obtained by incorporating from about 0.01% to about 20% by weight of an anti-caking agent on the microcapsules. Exemplary contemplated anti-caking agents are as follows:
calcium silicate;
tricalcium phosphate;
calcium carbonate; and
mixtures thereof.

EXAMPLES

The following examples illustrate how to practice the present invention. The scope of the invention is not limited to the embodiments illustrated in these representative examples, but is set forth in the appended claims.

Example I 2,000 pounds of deodorized hydrogenated beef tallow (iodine value around 10, melting point 140° F. or 60° C.) was heated to 180° F. (82° C.) in a jacketed tank. The molten material was agitated with a LIGHTNIN' mixer sold by Mixing Equipment Co., Inc., Rochester, N.Y., as model no. NC-42 VS). To the melt 500 pounds (226 kg.) of high fructose corn syrup (80% solids) and 7 ½ pounds (3.4 kg.) of flavor were added. When dispersion was complete the circulating pump was started and circulation established. A portion of the circulating material was diverted to the spray pump, which forced the dispersion to the top of the spray tower (pressure at pump: 400-500 psig or 275-345 N/cm$^2$) where it passed through a pressure atomizing nozzle into the tower. The tower was held at about 65° F. (18° C.). This temperature can be maintained by the use of cryogenic gas, ambient air (in cool weather) or refrigerated air.

The particles falling from the tower were slightly tacky. They were placed in a rotary mixer and 0.25% powdered calcium silicate was added. The final mix was a uniform, free-flowing powder with a particle diameter of around 425 microns (United States Sieve Series #40 mesh).

The resulting product can be used as a highly palatable fat additive in feeds for rumenant and monogastric animals.

Example II 20.75 pounds (9.39 kg.) of partially hydrogenated cottonseed oil (m.p. 146° F., 63° C.) was melted with 0.25 pounds (113 g.) of 90% pure alpha form glyceryl monostearate (Eastman Mighty Soft, sold by the Distillation Products Division of Eastman Kodak Co., Rochester, N.Y.) and the melt was heated to 185° F. (95° C.).

Into this melt was mixed 7 pounds (3.2 kg.) of 300 grain (30% acetic acid) vinegar with vigorous agitation. The mixture was poured into a holding chamber feeding a high pressure pump. Mechanical agitation was carried on in the holding chamber during spraying.

The mixture was atomized into a 60° F. (16° C.) chamber and collected. It formed a free flowing powder with a strong vinegar odor. When dispersed in hot water it gave a sharp flavor and strong odor.

The resulting product can be added to dry barbeque sauce mix to provide a vinegar note when the mix is dispersed in water.

Example III 15 pounds (6.8 kg.) of partially hydrogenated cottonseed oil (m.p. 146° F., 63° C.) were melted and heated to 185° F. (85° C.). To this melt were added 5 pounds (2.3 kg.) of FIDCO 4 BE dry powdered hydrolyzed vegetable protein. (FIDCO 4 BE is a trademark of Fidco, a subsidiary of the Nestle Co., White Plains, N.Y.) The hydrolyzed vegetable protein dispersed in the fat but then melted and became a heavy, viscous, tar-like sludge. No attempt was made to spray this test.

Example IV 21 pounds (9.5 kg.) of partially hydrogenated cottonseed oil (m.p. 146° F., 63° C.) were melted and heated to 185° F. (85° C.). In a separate container 2 pounds (0.9 kg.) of water were heated and 5 pounds (2.3 kg.) of FIDCO 4 BE hydrolyzed vegetable protein were dissolved in the water. The solution was heated to 185° F. (85° C.) and mixed into the melted fat with vigorous agitation.

The mixture was poured into a holding chamber feeding a high pressure pump. Mechanical agitation was carried on in the holding chamber during spraying.

The mixture was atomized into a 60° F. (16° C.) chamber and collected. It formed a free flowing powder with a "beefy" odor.

100 grams of flour and 27 grams of the sprayed material were mixed with 400 grams of water and heated to boiling, forming a gravy with a typical "beefy" taste.

What is claimed is:

1. A process for making edible microcapsules containing a multiplicity of liquid cores, comprising the steps of:
    a. heating an edible shell material selected from the group consisting of edible fats, edible waxes, edible resins and mixtures thereof to a temperature sufficient to liquify said shell material;
    b. forming an emulsion of said liquified shell material with an edible liquid core material, said edible liquid core material being immiscible with said shell material and having a boiling point, at ambient atmospheric pressure, above the temperature sufficient to liquify said shell material, whereby said shell material is in continuous phase and said liquid core material is in discontinuous phase;
    c. transporting said emulsion in turbulent flow conditions, thereby maintaining said shell material and said liquid core material in the emulsified state, to a low temperature zone, said zone formed by flowing a gas at a temperature maintained below the temperature sufficient to liquify said shell material and above the temperature at which said liquid core material solidifies;
    d. delivering said emulsion into said low temperature zone by flowing said emulsion through a spray nozzle and spraying said emulsion into said low temperature zone and maintaining said emulsion so delivered in said low temperature zone for a time sufficient to cool said shell material into form-retaining condition and to form microcapsules containing a multiplicity of liquid cores made from said liquid core material, as the discontinuous phase, surrounded by said shell material, as the continuous phase, and whereby said multiplicity of liquid cores comprise from about 1% to about 35% by weight of the microcapsule; and
    e. Recovering the microcapsules formed from step d.

2. The process of claim 1, further including the step of mixing the microcapsules recovered from step e with an edible anticaking agent selected from the group consisting of calcium silicate, tricalcium phosphate, calcium carbonate, and mixtures thereof, to form a free-flowing powder comprising said microcapsules.

3. The process of claim 1 or 2, wherein said edible liquid core material is formed by mixing a water soluble material selected from the group consisting of edible sugars, artificial sweeteners, edible acids, edible starches, hydrolyzed vegetable protein, gums, vitamins, medicaments, nutritional minerals, flavors, antimicrobial agents, antimycotic agents, antioxidants, pigments, dyes, salt, and mixtures thereof, with water prior to step b.

4. The process of claims 1 or 2, further including the step of adding an emulsifying agent selected from the group consisting of glyceryl monostearate, polysorbate esters, ethoxylated monoglycerides, ethoxylated diglycerides, and mixtures thereof in step b to assist in forming said emulsion.

5. The process of claim 3, further including, in step b, the step of maintaining the ratio of the viscosity, expressed in centipoise, of said liquified shell material to the viscosity, expressed in centipoise, of said liquid core material in the range of from about 22 to 1 to about 1 to 1.

* * * * *